United States Patent
Koganezawa

(10) Patent No.: US 8,259,418 B2
(45) Date of Patent: Sep. 4, 2012

(54) HEAD SUSPENSION ASSEMBLY AND DISK DEVICE WITH THE SAME

(75) Inventor: Shinji Koganezawa, Atsugi (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/152,114

(22) Filed: Jun. 2, 2011

(65) Prior Publication Data

US 2012/0002321 A1 Jan. 5, 2012

(30) Foreign Application Priority Data

Jun. 30, 2010 (JP) ................. 2010-150352

(51) Int. Cl.
*G11B 21/21* (2006.01)

(52) U.S. Cl. ...................................... 360/266

(58) Field of Classification Search .......... 360/266
See application file for complete search history.

(56) References Cited

U.S. PATENT DOCUMENTS

| | | | |
|---|---|---|---|
| 6,366,432 B1 * | 4/2002 | Tadepalli et al. ............ 360/266 |
| 6,597,540 B2 | 7/2003 | Tsuda et al. |
| 7,130,158 B2 * | 10/2006 | Kubotera et al. ............ 360/266 |
| 7,133,249 B2 * | 11/2006 | Miyajima .................. 360/97.14 |
| 7,304,823 B2 | 12/2007 | Suzuki |
| 7,405,902 B2 * | 7/2008 | Sorrell et al. ............. 360/97.13 |
| 7,697,240 B2 | 4/2010 | Funabashi et al. |
| 2002/0154449 A1 * | 10/2002 | Raphael et al. ............ 360/266 |
| 2002/0186511 A1 | 12/2002 | Tsuda et al. |
| 2002/0186512 A1 * | 12/2002 | Kubotera et al. ............ 360/266 |
| 2005/0122626 A1 | 6/2005 | Suzuki |
| 2005/0152070 A1 | 7/2005 | Funabashi et al. |

FOREIGN PATENT DOCUMENTS

| | | |
|---|---|---|
| JP | H07-014332 | 1/1995 |
| JP | H11-185415 | 7/1999 |
| JP | 2001-118344 | 4/2001 |
| JP | 2003-513393 | 4/2003 |
| JP | 4190497 | 12/2008 |
| WO | WO 2004/040571 | 5/2004 |

OTHER PUBLICATIONS

Notice of Reasons for Rejection mailed by the Japan Patent Office on Sep. 20, 2011 in corresponding Japanese patent app. No. 2010-150352 in 6 pages.

* cited by examiner

*Primary Examiner* — Mark Blouin
(74) *Attorney, Agent, or Firm* — Knobbe Martens Olson & Bear LLP

(57) ABSTRACT

According to one embodiment, a head suspension assembly includes an arm includes upper and lower surfaces, a suspension extending from the arm, a head supported by the suspension, and restriction plates bonded on the upper and lower surfaces of the arm. The restriction plates includes extending portions projecting from the arm to a downstream side of an airflow, respectively, and the extending portions are bent in a direction in which the extending portions approach each other.

17 Claims, 3 Drawing Sheets

HEAD SUSPENSION ASSEMBLY AND DISK DEVICE WITH THE SAME

CROSS-REFERENCE TO RELATED APPLICATIONS

This application is based upon and claims the benefit of priority from Japanese Patent Application No. 2010-150352, filed Jun. 30, 2010; the entire contents of which are incorporated herein by reference.

FIELD

Embodiments described herein relate generally to a head suspension assembly used in a disk device and to a disk device provided with the head suspension assembly.

BACKGROUND

Recently, disk devices such as magnetic disk drives and optical disk drives have become widely used as external recording devices and image storage devices of computers.

As a disk device, for example, the magnetic disk drive generally comprises a magnetic disk arranged in a case, a spindle motor for supporting and rotating the magnetic disk, a carriage assembly for supporting a magnetic head, a voice coil motor (VCM) for driving the carriage assembly, a circuit board unit, and the like.

The carriage assembly includes a bearing unit and a plurality of arms, which are stacked on the bearing unit and extend from the bearing unit, and the magnetic head is attached to each of the arms via a suspension. The magnetic head, the suspension, and the arm configure a head suspension assembly.

There is provided a magnetic disk drive wherein damper members are bonded to the arms in order to inhibit the arms from vibrating due to an airflow produced in the magnetic disk drive by rotation of the magnetic disk. Further, there is provided a magnetic disk drive wherein arms have through holes between the upper and lower surfaces and a seal member is attached to the arms so as to reduce a disturbance of an airflow to the arms. The seal member is formed to have a U-shaped cross section or a rectangular cross section and attached to the arm from a side or from a head side. A projection is formed on an upstream side or a downstream side to diffuse the airflow up and down.

In the magnetic disk device, when the projection is provided on the upstream side or the downstream side of the arms and the airflow is diffused up and down, there is a possibility that the projection is vibrated up and down by the airflow and the vibration causes a head suspension assembly to vibrate. It is considered that the magnetic head is vibrated accordingly, so that a positioning accuracy is deteriorated.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

DETAILED DESCRIPTION

Various embodiments will be described hereinafter with reference to the accompanying drawings.

In general, according to one embodiment, a head suspension assembly comprises an arm comprising upper and lower surfaces; a suspension extending from the arm; a head supported by the suspension; and restriction plates bonded on the upper and lower surfaces of the arm. The restriction plates comprise extending portions projecting from the arm to a downstream side of an airflow, respectively, and the extending portions are bent in a direction in which the extending portions approach each other.

Figure 1:
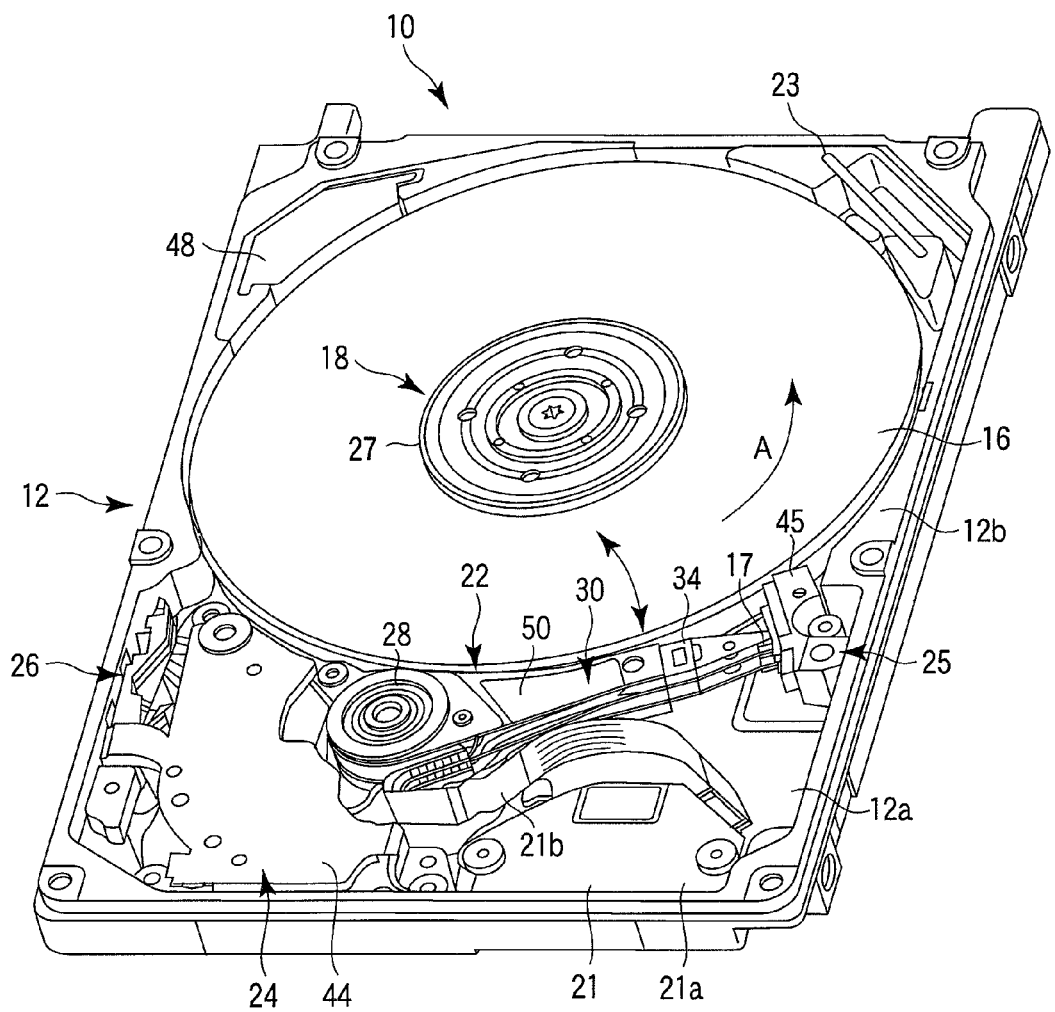
FIG. 1 is an exemplary perspective view showing a hard disk drive (HDD) according to a first embodiment by removing a top cover.

A magnetic disk drive (HDD) according to a first embodiment will now be described in detail. FIG. 1 shows the internal structure of the HDD with its top cover removed. As shown in FIG. 1, the HDD comprises a housing 10. The housing 10 comprises a base 12 in the form of an open-topped rectangular box and a top cover (not shown), which is attached to the base by screws so as to close the top opening of the base. The base 12 comprises a rectangular bottom wall 12a and sidewall 12b set up along the peripheral edge of bottom wall.

The housing 10 contains two magnetic disks 16 for use as recording media and a spindle motor 18 for use as a drive section that supports and rotates the magnetic disks 16. The spindle motor 18 is disposed on the bottom wall 12a. Each magnetic disk 16 has a diameter of, for example, 65 mm (2.5 inches) and comprises magnetic recording layers on its upper and lower surfaces, individually. The magnetic disks 16 are coaxially fitted on a hub (not shown) of the spindle motor 18 and clamped and secured to the hub by a clamp spring 27. Thus, the magnetic disks 16 are supported parallel to the bottom wall 12a of the base 12. The disks 16 are rotated at a predetermined speed, e.g., 10,000 or 7,200 rpm, by the spindle motor 18.

Accommodated in the housing 10 are a plurality of magnetic heads 17 for recording and reproducing information to and from the magnetic disks 16, a carriage assembly 22 supporting the magnetic heads for movement relative to the magnetic disks 16, a voice coil motor (VCM) 24 for rotating and positioning the carriage assembly 22, a ramp load mechanism 25 which holds the magnetic heads 17 at unload positions away from the magnetic disks 16 when the magnetic heads 17 move to outermost peripheries of the magnetic disks 16, a latch mechanism 26 which holds the carriage assembly 22 at an evacuate position when a shock and the like acts on the HDD, and a board unit 21 including a preamplifier and the like.

A printed circuit board (not shown) is fixed to an outer surface of the bottom wall 12a of the base 12 by screws. The printed circuit board controls operations of the spindle motor 18, the VCM 24, and the magnetic heads 17 via the board unit 21. A circulation filter 23 is arranged in the sidewall 12b of the base 12 to capture dust produced in the housing 10 due to an operation of a movable portion and is positioned outside of the magnetic disks 16. A breather filter 48 is provided at the sidewall 12b of the base 12 to capture dust from the air that flows into the housing 10.

Figure 2:
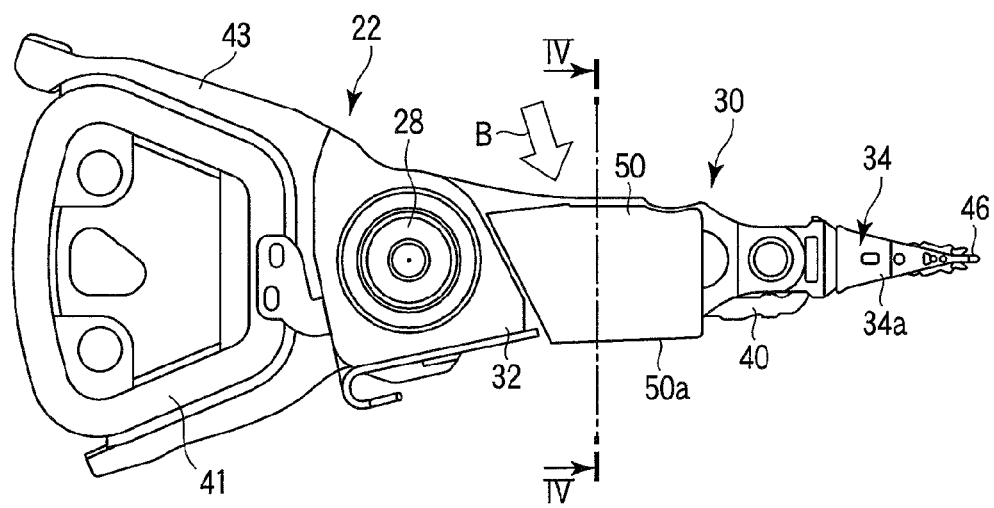
FIG. 2 is an exemplary plan view showing a carriage assembly of the HDD.
Figure 3:
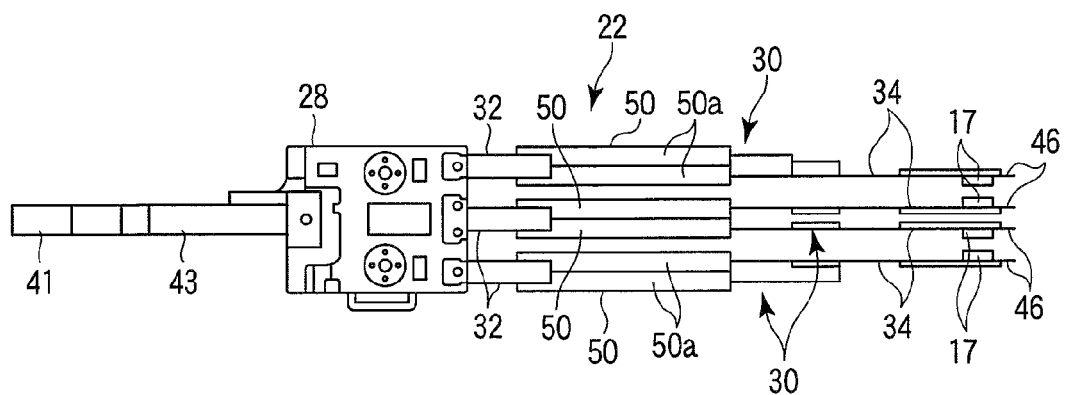
FIG. 3 is an exemplary side view showing the carriage assembly.

FIGS. 2 and 3 are an exemplary plan view and an exemplary side view of the carriage assembly 22. As shown in FIGS. 1 to 3, the carriage assembly 22 includes a rotatable bearing unit 28 and a plurality of stack members attached to the bearing unit 28 in a laminated state. The stack members include three head suspension assemblies 30 and two spacer rings.

The bearing unit 28 is positioned away from a rotation center of the magnetic disks 16 in a longitudinal direction of the base 12 and arranged in the vicinities of outer peripheral edges of the magnetic disks 16. The bearing unit 28 includes a pivot shaft standing on the bottom wall 12a of the base 12 and a cylindrical sleeve rotatably supported on the pivot shaft via a bearing.

The head suspension assemblies 30 comprises arms 32 extending from the bearing unit 28, suspensions 34 extending from the arms, and the magnetic heads 17 supported by the suspensions. Note that a head suspension assembly 30 positioned in a central portion includes two suspensions 34 extending from an arm 32.

Each of the arms 32 is a thin flat plate formed by laminating, for example, stainless-steel, aluminum, and stainless-steel sheets. A circular through-hole is formed in one end or proximal end of the arm 32. The suspension 34 comprises a load beam 34a in the form of an elongated plate spring and a gimbal (not shown) mounted on the load beam. The magnetic heads 17 are attached to the gimbals. The suspension 34 has its proximal end secured to the distal end of the arm 32 by spot welding or adhesive bonding and extends from the arm. The suspension 34 and arm 32 may be integrally formed of the same material.

A flexure 40 for use as a conductor trace is mounted on the arm 32 and suspension 34. The flexure 40 extends from the suspension 34 up to the proximal end of the arm 32 along the arm 32. The magnetic head 17 is electrically connected to a main FPC 21b (described later) through the flexure 40.

The three head suspension assemblies 30 and the spacer rings are fitted on the outer periphery of the sleeve of the bearing unit 28 that is passed through the respective through-holes of the arms 32 and spacer rings, and are laminated along the axis of the sleeve. With the configuration, the three arms 32 are positioned in parallel with one another at predetermined intervals and extend in the same direction from the bearing unit 28. Two arms 32 on an upper side are positioned in parallel with each other at a predetermined interval, and suspensions 34 and magnetic heads 17 attached to the arms are positioned so as to face each other. Two arms 32 on a lower side are positioned in parallel with each other at a predetermined interval, and suspensions 34 and magnetic heads 17 attached to the arms are positioned so as to face each other.

One of the spacer rings is integrally molded with a support frame 43 composed of a synthetic resin. The support frame 43 extends from the bearing unit 28 in a direction opposite to the arms 32. The support frame 43 is buried with a voice coil 41 which configures a part of the VCM 24.

Figure 4:
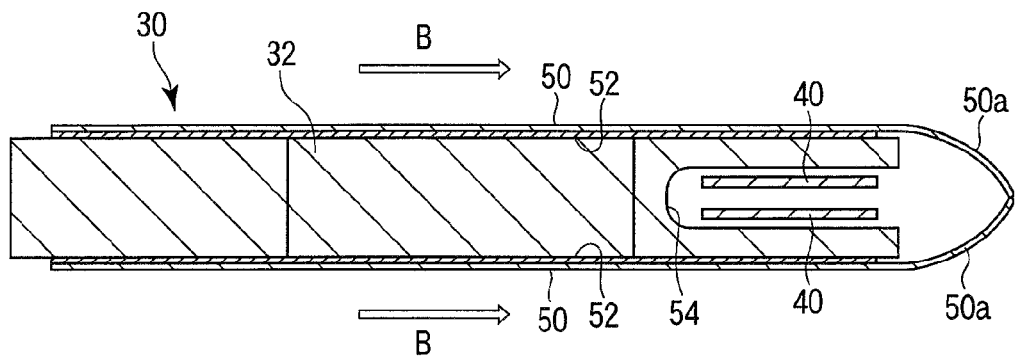
FIG. 4 is an exemplary sectional view of a head suspension assembly taken along line IV-IV of FIG. 2.

FIG. 4 is an exemplary sectional view of the head suspension assembly 30 taken along line IV-IV of FIG. 2. As shown in FIGS. 2 to 4, in the respective head suspension assemblies 30, arm dampers are provided on upper and lower surfaces of the arm 32, respectively, for the purpose of reducing vibration of the arm 32. The arm dampers include restriction plates 50 formed of, stainless steel, aluminum, synthetic resin, or the like and bonded to upper and lower surfaces of the arm 32 by viscoelastic material layers 52 for absorbing vibration.

The restriction plates 50 include extending portions 50a which project from the side edge of the arm 32 to downstream side of the arm with respect to airflows B produced by a rotation of the magnetic disks 16, respectively. The extending portions 50a are bent while being gently curved in a direction in which they approach each other, and extending ends of the upper and lower extending portions 50a are abutted with each other. To prevent the extending portions 50a from being in unstable contact with each other because of vibration of the restriction plates 50 due to the airflows B, the upper and lower restriction plates 50 are bonded to the arms 32 in a state where the extending portions 50a are previously pressurized in a direction in which the extending portions 50a approach each other.

As shown in FIGS. 2 and 4, recesses 54 are formed in side edge portions of the arms 32 on a downstream side relative to the airflows B and extend in a longitudinal direction of the arms 32. The flexures 40, which extend from the suspensions 34, extend to the proximal end sides of the arms 32 passing through in the recesses 54. The derive portions of the flexures 40 are positioned between the upper and lower restriction plates 50 bonded to the arms 32.

As can be found well from FIG. 1, a lower end portion of the pivot shaft of the bearing unit 28 is fixed to the base 12 and stands approximately in parallel with a spindle of the spindle motor 18 in a state where the carriage assembly 22 configured as described above is assembled on the base 12. The respective magnetic disks 16 are positioned between the two head suspension assemblies 30. When the HDD operates, the magnetic heads 17 attached to the suspensions 34 confront upper surfaces and lower surfaces of the magnetic disks 16, respectively, and sandwich the magnetic disks from both sides thereof. The voice coil 41 fixed to the support frame 43 is positioned between a pair of yokes 44 fixed on the base 12 and configures the VCM 24 together with the yokes and a not shown magnet fixed to one of the yokes.

As shown in FIG. 1, the board unit 21 includes a main body 21a formed of a flexible printed circuit board, and the main body 21a is fixed to the bottom wall 12a of the base 12. Not shown electronic parts such as a head amplifier are mounted on the main body 21a. A not shown connector is mounted on a bottom surface of the main body 21a and connected to the printed circuit board.

The board unit 21 includes a main flexible printed circuit board (main FPC) 21b extending from the main body 21a. An extending end of the main FPC 21b configures a connection end portion which is fixed in the vicinity of the bearing unit 28. The flexures 40 of the respective head suspension assemblies 30 are mechanically and electrically connected to the connection end portion of the main FPC 21b. With the configuration, the board unit 21 is electrically connected to the magnetic heads 17 via the main FPC 21b and the flexures 40.

As shown in FIG. 1, the ramp load mechanism 25 is disposed at the bottom wall 12a of the base 12 as well as includes ramps 45 disposed outside the magnetic disks 16 and tabs 46 (FIG. 2, FIG. 3) extending from front ends of the respective load beams 34a. When the carriage assembly 22 rotates around the bearing unit 28 and the magnetic heads 17 move up to an unload position outside of the magnetic disks 16, the respective tabs 46 are engaged with ramp surfaces formed to the ramps 45 and thereafter pulled upward by slopes of the ramp surfaces. With the operation, the magnetic heads 17 are unloaded from the magnetic disks 16 and kept at the evacuate positions.

According to the HDD configured as described above, when the HDD operates, the magnetic disks 16 are rotated at a high speed and the carriage assembly 22 is rotated about the bearing unit 28 by energizing the voice coil 41, and the magnetic heads 17 are moved onto desired tracks of the magnetic disks 16 and positioned thereat. Information processing is performed to the magnetic disks 16 by the magnetic heads 17, that is, information is written to and read from the magnetic disks 16.

In operation, the airflows B, which are produced by the rotation of the magnetic disks 16, flow downstream along the upper and lower surfaces of the respective arms 32 of the carriage assembly 22. At the time, the extending portions 50*a* of the restriction plates 50, which are bonded on the upper and lower surfaces of the arms 32, project from the arms 32 onto the downstream side and are bent while being gently curved in the direction in which they approach each other. Accordingly, separation of the air, which flows along the upper and lower surfaces of the arms 32 can be delayed or occurrence of the separation of the air can be prevented in a best case. As a result, since generation of a large eddy of air produced on side surfaces of the arms 32 on a downstream side can be suppressed, a vibrational force acting on the arms 32 and the carriage assembly 22 can be reduced.

Further, since tail portions of the suspensions 34, that is, the flexures 40 extending from the suspensions can be surrounded by the extending portions 50*a* of the restriction plates 50 so that they are not exposed to the airflow, vibration of the flexures 40 by the airflow can be avoided. Accordingly, positional offset of the heads 17 due to the vibration of the flexures 40 can be suppressed. Further, since extending portions 52*a* may be configured by partly extending the restriction plates 50 which configure the arm dampers, an increase of a manufacturing cost can be suppressed without a need of additional parts.

From what has been described above, according to the embodiment, there can be provided a head suspension assembly, which can reduce vibration of the arms by an airflow and can improve a positioning accuracy of heads, and a magnetic disk device including the head suspension assembly.

Next, head suspension assemblies of an HDD according to other embodiments will be explained.

Figure 5:
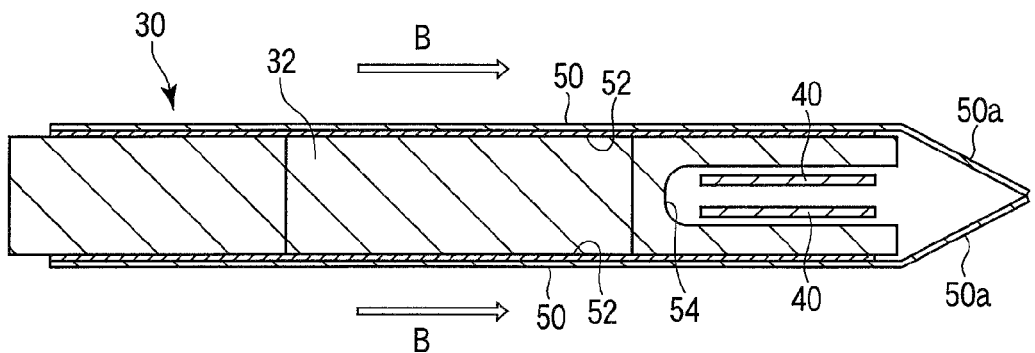
FIG. 5 is an exemplary sectional view of a head suspension assembly of an HDD according to a second embodiment.

FIG. 5 shows a cross section of a head suspension assembly 30 of an HDD according to a second embodiment. According to the second embodiment, restriction plates 50 bonded to upper and lower surfaces of an arm 32, respectively include extending portions 50*a* projecting from side edges of the arm 32, respectively on a downstream side of airflows B produced by a rotation of a magnetic disk 16. The extending portions 50*a* are linearly bent in a direction in which they approach each other, and extending ends of the upper and lower extending portions 50*a* are made to abut each other. To prevent the extending portions 50*a* from being in unstable contact with each other because of vibration of the restriction plates 50 due to the airflows B, the upper and lower restriction plates 50 are bonded to the arm 32 in a state where the restriction plates 50 are previously pressurized in a direction in which the extending portions 50*a* approach each other.

Figure 6:
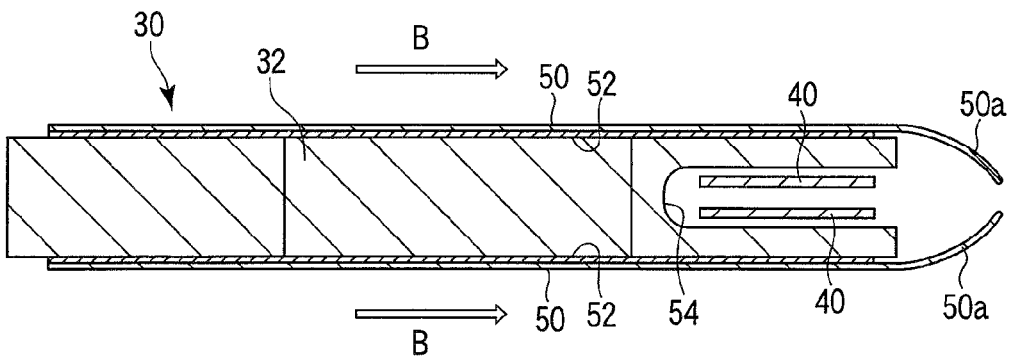
FIG. 6 is an exemplary sectional view of a head suspension assembly of an HDD according to a third embodiment.

FIG. 6 shows a cross section of a head suspension assembly 30 of an HDD according to a third embodiment. According to the third embodiment, restriction plates 50 bonded to upper and lower surfaces of an arm 32, respectively include extending portions 50*a* extending from side edges of the arm 32, respectively on a downstream side of airflows B produced by a rotation of a magnetic disk 16. The extending portions 50*a* are bent while being gently curved in a direction in which they approach each other, and extending ends of the upper and lower extending portions 50*a* face each other at a minute interval.

In the second and third embodiments, since other configurations of the HDD and the head suspension assembly 30 are the same as those of the first embodiment described above, the same portions are denoted by the same reference numbers and the detailed explanation thereof will be omitted.

Also in the second and third embodiments configured as described above, separation of the air, which flows along the upper and lower surfaces of the arm 32 can be delayed or occurrence of the separation of the air can be prevented in a best case. As a result, since generation a large eddy of air produced on a side surface of the arm on a downstream side can be suppressed, a vibrational force acting on the arm 32 and the carriage assembly 22 can be reduced. Accordingly, positional offset of a head due to vibration of a flexure 40 can be suppressed by avoiding vibration induced in the flexure 40 by the airflow. Further, since an extending portion 52*a* may be configured by partly extending the restriction plate 50 which configures an arm damper, the manufacturing cost can be kept down by avoiding the need for additional parts.

From what has been described above, according to the second and third embodiments, there can be provided a head suspension assembly, which can reduce vibration of an arm by an airflow and can improve a positioning accuracy of a head, and a magnetic disk device including the head suspension assembly.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

In the embodiments described above, although the arms of the carriage assembly use plate-shaped arms which are independent of each other, the arms are not limited thereto and so-called E-block-shaped a plurality of arms integrally formed with bearing sleeves may be applied. The magnetic disk is not limited to a 2.5-inch disk and may be a magnetic disk having other size. A number of the magnetic disks is not limited to two and may be one or three or more, and a number of the head suspension assemblies may be increased or reduced according to a number of installed magnetic disks.

What is claimed is:

1. A head suspension assembly comprising:
   an arm comprising upper and lower surfaces;
   a suspension extending from the arm;
   a head mechanically coupled to the suspension; and
   a first restriction plate mechanically coupled to the upper surface of the arm and a second restriction plate mechanically coupled to the lower surface of the arm,
   wherein the first and second restriction plates comprise first and second extending portions, respectively, the first and second extending portions extending from the arm to a downstream side of an airflow, and at least a portion of the first and second extending portions angled toward one another in the downstream side.

2. The head suspension assembly of claim 1, wherein at least a portion of the first and second extending portions are in contact with each other.

3. The head suspension assembly of claim 2, wherein the extending portions were angled towards one another via pressurization.

4. The head suspension assembly of claim 1, wherein the respective restriction plates are bonded to the arm by a viscoelastic material.

5. The head suspension assembly of claim 1, wherein the extending portions of the restriction plates linearly extend in a direction in which the extending portions approach each other.

6. The head suspension assembly of claim 1, wherein the extending portions are curved to the downstream side.

7. The head suspension assembly of claim 1 further comprising a signal trace mechanically coupled to the suspension and electrically coupled to the head, and the signal trace extends between the restriction plates along the arm.

8. The head suspension assembly of claim 7, wherein the arm comprises a recess formed in the side edge between the restriction plates, and at least a portion of the signal trace is in the recess.

9. A head suspension assembly comprising;
an arm comprising upper and lower surfaces;
a suspension extending from the arm;
a head mechanically coupled to the suspension;
a signal trace mechanically coupled to the suspension and electrically coupled to the head; and
a first restriction plate mechanically coupled to the upper surface of the arm and a second restriction plate mechanically coupled to the lower surface of the arm,
wherein the first and second restriction plates comprise first and second extending portions, respectively, the first and second extending portions extending from the arm to a downstream side of an airflow, and at least a portion of the first and second extending portions angled toward one another in the downstream side;
the arm comprises a recess formed in the side edge between the restriction plates, and at least a portion of the signal trace is in the recess.

10. A disk device comprising:
a disk-shaped recording medium;
a drive motor configured to rotate the recording medium; and
a head actuator configured to be movable with respect to the recording medium,
the head actuator comprising a plurality of head suspension assemblies,
wherein the respective head suspension assemblies comprise an arm, the arm comprising upper and lower surfaces; a first restriction plate and a second restriction plate mechanically coupled on the upper and lower surfaces of the arm respectively,
wherein the first and second restriction plates comprise extending portions extending from the arm to a downstream side of an airflow,
wherein at least a portion of the first and second extending portions are angled toward one another in the downstream side.

11. The disk device of claim 10, wherein at least a portion of the first and second extending portions are in contact with each other.

12. The disk device of claim 11, wherein the extending portions were angled towards one another via pressurization.

13. The disk device of claim 10, wherein the respective restriction plates are bonded to the arm by a viscoelastic material.

14. The disk device of claim 10, wherein the extending portions of the restriction plates linearly extend in a direction in which the extending portions approach each other.

15. The disk device of claim 10, wherein the extending portions are curved to the downstream side.

16. The disk device of claim 10 further comprising a signal trace mechanically coupled to the suspension and electrically coupled to the head, and the signal trace extends between the restriction plates along the arm.

17. The disk device of claim 16, wherein the arm comprises a recess formed in the side edge between the restriction plates, and at least a portion of the signal trace is in the recess.

* * * * *